April 30, 1963   J. BARRALON   3,087,256
EDUCATIONAL TEST APPARATUS
Filed April 22, 1960   2 Sheets-Sheet 1
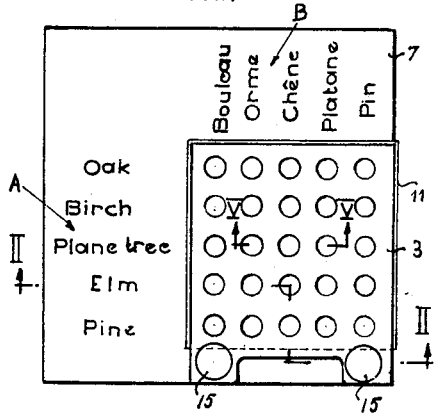
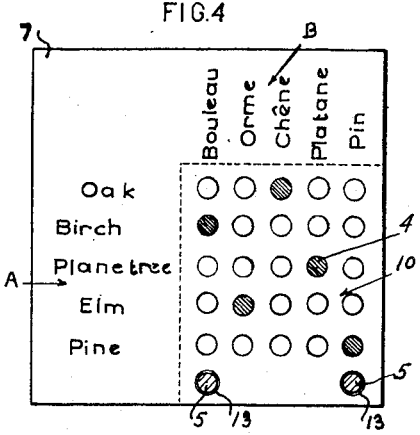
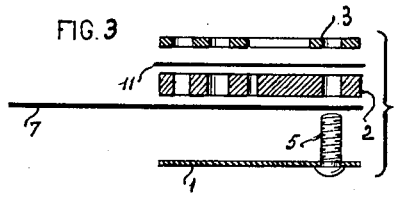
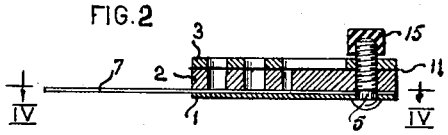
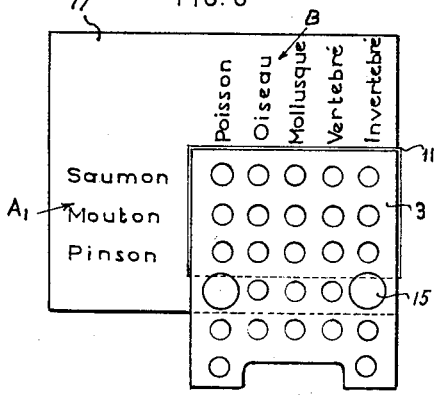
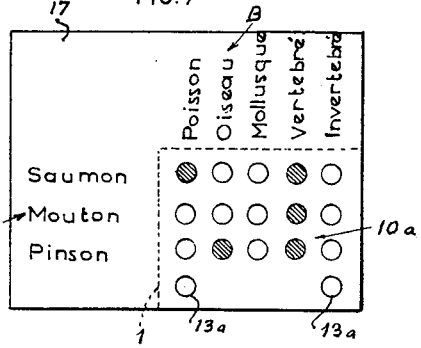
Inventor
J. Barralon April 30, 1963  J. BARRALON  3,087,256
EDUCATIONAL TEST APPARATUS
Filed April 22, 1960  2 Sheets-Sheet 2

Inventor
J. Barralon

United States Patent Office 3,087,256
Patented Apr. 30, 1963

3,087,256
EDUCATIONAL TEST APPARATUS
Jacques Barralon, Trappes, France, assignor of fifty percent to Michel Capron, Paris, France
Filed Apr. 22, 1960, Ser. No. 24,075
Claims priority, application France Apr. 23, 1959
3 Claims. (Cl. 35—9)

This invention relates to educational apparatus usable for psychological, vocational and related testing purposes, or as a game. More specifically the invention is concerned with that type of testing in which a subject is examined for his competence in a prescribed field of knowledge, or for his psychological reactions to certain concepts presented to him, by being asked to point out what he believes to be a correct correspondence between two different series of ideas, symbols or items of information.

Tests of this kind are widely used at the present time in various public institutions such as schools, vocational centers, homes for backward children, and the like, and it is often desirable that large numbers of subjects be tested quickly and reliably under the supervision of a small number of trained personnel. It is an object of this invention to provide improved equipment whereby this result may be achieved more efficiently than was heretofore possible. Another object is to provide the test results derived from such tests in the form of individual distinctive sheets from each tested subject, in which his results will be obtained in the form of a distinctive "perforation code," suitable for processing in punched-card equipment, and wherein such sheets will be inherently incapable of being tampered with; other objects and advantages will appear.

According to the invention there is provided educational test apparatus comprising in combination at least one test paper including two series of information items spaced along respective coordinate directions, there being a prescribed "correct" correspondence between each of at least some of the items in one series and at least one item in the other series; said test paper including a limited area thereof bounded on two sides not parallel to one another by information items of the respective series, reference marks in said area at positions determined by each correct correspondence between items of the respective series; a pair of perforate plates having registering perforations spaced in accordance with the spacing of the information items in both series; means for positioning the plates in superimposed registering relation with the lower one of said plates overlying said test-paper area and with a blank sheet interposed between said lower plate and the other overlying plate; whereby the perforation made in this blank sheet by a stylus or the like inserted through a selected perforation of said overlying plate will coincide with a reference mark on the test paper if and only if the selected perforation represents the prescribed correct correspondence between information items of the respective series.

Exemplary embodiments of the invention will now be described for purposes of illustration but with no limitative intent with reference to the accompanying drawings, wherein:

FIG. 1 shows in general plan, or front, view, apparatus according to the invention including a test paper and perforate plates;

FIG. 2 is a section on line II—II of FIG. 1;

FIG. 3 is an exploded view of FIG. 2;

FIG. 4 shows the test-paper illustrated in FIG. 1, when removed from the perforate plate assembly to illustrate the reference marks thereon;

FIG. 5 is a sectional end view of the apparatus while being used by a test subject;

FIGS. 6 and 7 are views generally similar to FIGS. 1 and 4 respectively, but relating to a modified form of apparatus;

Figure 8:
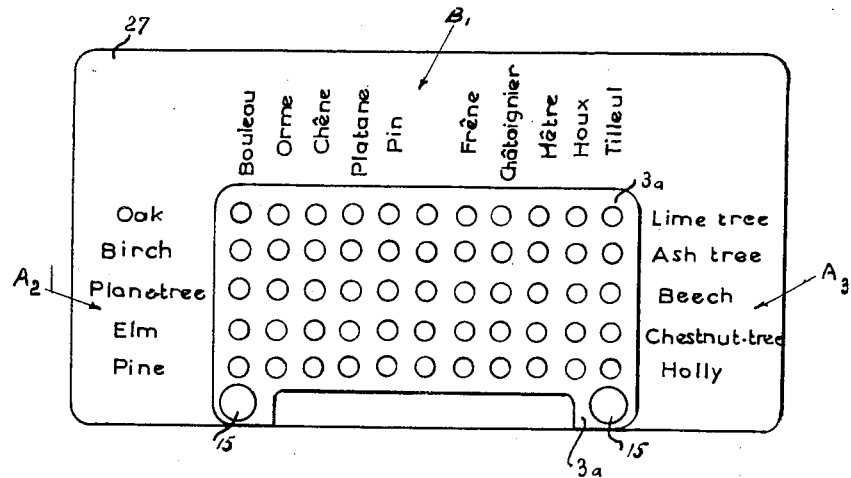
FIGS. 8 and 9 are views generally similar to FIGS. 1 and 4 respectively but relating to a further modification.

Referring first to FIGS. 1 to 3, the assembly of the invention as there shown comprises a baseplate 1, a lower perforate plate 2 and an upper perforate plate 3. The perforate plates 2 and 3 are maintained in assembly with the baseplate 1 by means of pins 5 projecting upwardly from the baseplate and through registering holes in both plates.

Provided according to the invention for use in conjunction with the plates 1, 2 and 3, are a number of test-papers such as the sheet 7 shown in FIG. 1, comprising two series of indications, symbols or other items of information which are respectively designated by A and B, and which are respectively aligned along two directions which do not run parallel to one another; in the illustrated example these are at right angles to each other, but they may form any other desired angle provided this angle is the same in all the tables of the set. The two series of indications are such that each of at least some of the indications of one series bears some informational relationship with an indication of the other series. Thus, in the example selected for illustration, the series A comprises the names of a number of trees in English, while the indications of the B series comprise the corresponding names in French. It will be noted that the order in which the names occur in the A series differs from the order in which the corresponding names occur in the B series. At the intersections between the coordinate lines extending from corresponding indications in the respective series, a distinctive index or reference mark is provided, and in this example the reference marks are shown (see FIG. 4) as hatched circles such as 4. All these reference marks are grouped within a rectangular area which is not larger than the area of perforate plate 2 or 3. As will presently appear, the perforate plates 2 and 3 serve as two similar cipher stencil plates and the perforations therein are so spaced as to be able to register with all of the intersections between the coordinates of both series of indications, including both those intersections at which reference marks occur, and all remaining intersections at which no such reference marks are present.

In use, a test paper such as 7 is laid over the baseplate 1 which is preferably provided thin so as to avoid distortion of the paper along its edges. The sheet 7 is positioned by insertion of the holes 13 in its sides around the pins 5. Then the lower perforate plate 2 is placed over the test-paper 7, by insertion of corresponding holes of the plate 2 around the pins 5, the reference marks on the paper 7 being located to be in alignment with the perforations of the plate 2. Next a blank card or sheet of paper 11 is placed over the plate 2, thereby concealing the reference marks from the subject's view, and finally the upper perforate plate 3 is in turn positioned by insertion of its positioning holes about the projecting shanks of pins 5. Caps 15 may be fitted over the projecting shanks of pins 5. The tested subject then inserts a pencil, stylus, or the like, designated 12 in FIG. 5, through those perforations of the upper plate 3 which he believes to lie at the intersections between the correctly corresponding items of information in both series A and B. In so doing, he pierces the blank sheet 11 with the tip of the stylus 12. Whenever the subject has selected the correct perforation, a reference mark, for example, a coloured spot, check, code or the like, will appear through the hole pierced in the sheet 11; when his selection is wrong, however, a blank area of the part 10 of the test-paper will appear through the hole in sheet 11, and such area may be made in some distinctive colour for readier visibility.

On removal of the blank sheet 11, now pierced at a number of positions, this sheet will constitute an individual test result which cannot be tampered with since the holes therein cannot be modified by the test subject. The blank sheets were preferably initially provided with the test subjects' names or numbers in a corner thereof, FIGS. 6 and 7 illustrate a test paper 17 in which there are more indications in one series, e.g. the series B, than in the other. In this example the B series has as many indications as there are perforations in the perforate plates along the horizontal coordinate direction, while the A1 series has less indications than said plates have perforations in the horizontal coordinate direction. Since the interaxial spacing between the positioning pins 5 is equal to the interaxial spacing between the outer longitudinal lines of perforations in plates 2 and 3, the pins 5 may be engaged through the holes 13a of the test paper 17 (FIG. 7) into any selected pair of perforations in plates 2 and 3 constituting the said outer longitudinal lines, whereby this pair of perforations may be so selected that the plates will entirely overlie the area 10a of the test paper without concealing the information at A1 and B.

Figure 9:
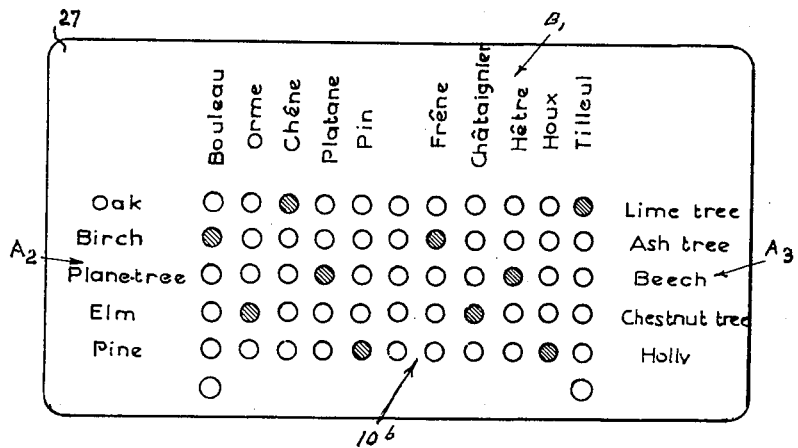

FIGS. 8 and 9 illustrate another modified arrangement in which one of the two series of informations is provided partly on either side of the area 10b, namely at A2 and A3. In such a case the perforate plates, such as plate 3a, would have at least twice as many perforations along the direction corresponding to the B1 series. The operation of this embodiment is of course entirely similar to that of the embodiment first described, but it will allow of providing a larger number of different combinations for a given set of dimensions.

It will be evident that the information carried by the test sheets may assume an infinite variety of forms. If desired, pictorial information may be used for one or both of the series. If there is insufficient space for inserting such picture information directly at the positions corresponding to the respective lines of perforations, then the information may instead be inserted as numerals (or other compact reference indicia) and the pictures may be provided in a distinct area of the test-paper and may be designated by corresponding numerals (or other indicia).

Thus, for example, there may be presented a number of pictures of aircraft of various types, say eight such types designated by numerals 1 through 8. The A series of indications would then comprise the series of numerals 1 through 8; and the B series would comprise the proper designations of the depicted types of aircraft, in a changed order.

In other cases, each information item of one series (or only certain ones of these items) might correspond to more than one item of the other series.

It will be apparent that the invention provides an extremely convenient and flexible, yet simple and economical, system for the performance of educational and vocational tests, games, and the like, susceptible of numerous practical applications.

It will be evident that various modifications and refinements may be made in the specific embodiments shown and described without departing from the scope of the invention. The sheets 11 may be provided in the form of standard cards with, for example, spaced perforatable areas adapted to be punched out by means of the stylus 12, pencil or finger used as a punch, so that the test results from each tested subject can then be conveniently processed in conventional data-handling machinery of the punched-card tabulator type.

What is claimed is:

1. In an educational test apparatus, the combination of a test paper comprising a series of questions extending along one coordinate direction and a series of answers extending along a second coordinate direction from the end of the series of questions, there being a correct correspondence between each of at least some of the items of one series with at least one item of the other series, said test-paper having a limited area thereof bounded on two non-parallel sides thereof by the items of the respective series; reference marks in said area of the test-paper at positions determined by each said correct correspondence between items of the respective series; a pair of perforate plates having registering perforations spaced in accordance with the spacing of said information items in both series, and means for positioning said plates in superimposed registering relation with the lower one of said plates overlying said area of the test-paper and with a blank sheet interposed between said lower plate and the overlying other plate; whereby the tip of a stylus inserted through a selected perforation of said overlying plate to pierce said blank sheet will coincide with a reference mark on said test-paper if and only if the selected perforation represents a correct correspondence between information items of the respective series.

2. Educational apparatus comprising at least one test paper having a limited area thereof bounded on at least two non-paralled sides thereof with respective series of questions and answers; reference marks within said area at the points of intersection between lines parallel to said sides and extending through "correctly" corresponding questions and answers of the respective series; a pair of plates formed with registering perforations spaced in accordance with said questions and answers and said plates having at least two dimensions thereof coextensive with said sides of said area; means for positioning said plates and test-paper in assembled, registering relation with said area of the test-paper underlying a lower one of said plates, and with a blank sheet interposed between said lower plate and the overlying plate; and a stylus-like punch for piercing said blank sheet through a selectioned perforation in said overlying plate.

3. In the apparatus claimed in claim 2, an imperforate baseplate assemblable with said plates and adapted to receive said test-paper thereon.

References Cited in the file of this patent

UNITED STATES PATENTS

| 1,806,156 | Fox | May 19, 1931 |
| 2,197,306 | Ingraham | Apr. 16, 1940 |
| 2,551,083 | Angell | May 1, 1951 |
| 2,656,618 | Pescatori | Oct. 27, 1953 |